US008883899B2

(12) United States Patent
Jousset et al.

(10) Patent No.: US 8,883,899 B2
(45) Date of Patent: Nov. 11, 2014

(54) FLAME-RETARDED THERMOPLASTIC COMPOSITIONS OF HIGH THERMOMECHANICAL STRENGTH, IN PARTICULAR FOR ELECTRIC CABLES

(75) Inventors: Dominique Jousset, Bougival (FR); Jean-Jacques Flat, Goupillieres (FR); Pierre Georlette, Omer (IL)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 13/881,491

(22) PCT Filed: Oct. 18, 2011

(86) PCT No.: PCT/FR2011/052431
§ 371 (c)(1),
(2), (4) Date: Jun. 10, 2013

(87) PCT Pub. No.: WO2012/056146
PCT Pub. Date: May 3, 2012

(65) Prior Publication Data
US 2013/0261244 A1  Oct. 3, 2013

(30) Foreign Application Priority Data
Oct. 26, 2010 (FR) ........................... 10 58757

(51) Int. Cl.
*H01B 3/44* (2006.01)
*F16L 57/04* (2006.01)
*C08L 53/00* (2006.01)
*C08G 81/02* (2006.01)
*C08L 87/00* (2006.01)
*C08L 33/16* (2006.01)

(52) U.S. Cl.
CPC ............... *H01B 3/447* (2013.01); *C08L 53/00* (2013.01); *F16L 57/04* (2013.01); *C08G 81/028* (2013.01); *C08L 87/005* (2013.01); *C08L 33/16* (2013.01)
USPC .......... 524/409; 174/119 C; 138/145

(58) Field of Classification Search
CPC .................. H01B 3/44; F16L 57/04
USPC .......... 524/409; 174/119 C; 138/145
See application file for complete search history.

(56) References Cited

U.S. PATENT DOCUMENTS

| 4,128,709 | A | 12/1978 | Vollkommer et al. |
| 4,996,276 | A | 2/1991 | Fishler et al. |
| 5,072,028 | A | 12/1991 | Fishler et al. |
| 6,025,423 | A | 2/2000 | Breant |
| 2004/0242751 | A1* | 12/2004 | Fischer .................. 524/445 |
| 2009/0253836 | A1 | 10/2009 | Flat et al. |
| 2010/0099817 | A1* | 4/2010 | Bizet et al. .................. 524/606 |

FOREIGN PATENT DOCUMENTS

| DE | 198 57 965 A1 | 6/2000 |
| EP | 0 629 678 A1 | 12/1994 |
| EP | 0 704 489 A1 | 4/1996 |
| EP | 0 816 422 A1 | 1/1998 |
| FR | 2 912 150 A1 | 8/2008 |
| WO | WO 2007/141449 A2 | 12/2007 |

OTHER PUBLICATIONS

V. Dave "Processing, characterization, and degradation studies of flame-retarded nylon 66", Recent Advances in Flame Retardancy of Polymeric Materials (1995), 6, 186-195.*
International Search Report (PCT/ISA/210) issued on Dec. 20, 2011, by the French Patent Office as the International Searching Authority for International Application No. PCT/FR2011/052431.

* cited by examiner

*Primary Examiner* — Michael M Bernshteyn
(74) *Attorney, Agent, or Firm* — Buchanan Ingersoll & Rooney P.C.

(57) ABSTRACT

A flame-retarded thermoplastic composition including a graft copolymer containing polyamide blocks and composed of a polyolefin backbone and on average at least one polyamide graft, in which the grafts are attached to the backbone by the residues of an unsaturated monomer (X) having a function capable of reacting with a polyamide, the residues of the unsaturated monomer (X) are attached to the backbone by grafting or copolymerization from its double bond, wherein the composition includes: —between 60% and 70% by weight of the graft copolymer containing polyamide blocks, —between 22% and 28% by weight of poly(pentabromobenzyl acrylate), —between 4% and 8% by weight of a synergistic flame retardant chosen from antimony trioxide, derivatives of tin, of molybdenum and/or bismuth and also boron and zinc oxides, calcium borates, calcium sulphate and/or zinc stannate, between 0.5% and 5% by weight of organophilic treated clay.

26 Claims, No Drawings

FLAME-RETARDED THERMOPLASTIC COMPOSITIONS OF HIGH THERMOMECHANICAL STRENGTH, IN PARTICULAR FOR ELECTRIC CABLES

FIELD OF THE INVENTION

The invention relates to flexible flame-retardant thermoplastic compositions of high thermomechanical strength, based on functionalized polyolefins grafted by polyamide units containing at least one combination of three agents having flame-retardant properties. The present invention also relates to the use of this composition as a coating layer (outer layer) in a cable, pipe or the like and also as a constituent material (inner layer) of a protective sheath, and also to such a cable, pipe, protective sheath or the like comprising at least one of the layers or coatings or materials consisting of this composition.

These compositions are of use in cabling for insulating and protecting electrical cables, optical fibers and for manufacturing electrical parts such as electrical connectors, and also in electrical engineering for molding articles such as housings.

Thermoplastic polymers such as polyethylenes, polyamides or mixtures thereof are good electrical insulators and are easy to process. They are used for making housings and electrical connectors and also coatings for cables. Electrical installations may be the source of short circuits and may ignite, they may also be brought into contact with a flame and therefore ignite and spread the fire along cable raceways. Various additives exist for rendering these materials nonflammable, some based on halogenated products, others on halogen-free products.

According to the UL 94 flame propagation test in accordance with the standard ISO 1210, the V0 classification is the best classification, which corresponds to a material that is not readily flammable, and does not produce flaming drips during the test.

For the V1 classification, the material is more readily flammable but does not produce flaming drips during the test. As regards the V2 classification, in addition to the easier flammability than for V0, flaming drips may be produced during the test.

For materials that are even more flammable, the classification NC (not classified) is given.

Thus, in the applications such as the covering of electrical cables, electrical and electrical engineering parts, and automotive applications, besides their electrically insulating nature, the materials must above all have a high level of fire resistance (flame retardancy). Furthermore, these materials or compositions must have a good mechanical strength, in particular good ultimate properties (elongation at break and tensile strength), but also excellent thermomechanical properties, such as creep at temperature, and also a good resistance to thermooxidation, that is to say the ability of the material to retain its mechanical properties during aging operations in hot air.

Nevertheless, taking into account the fact that, for the thermoplastic compositions, the improvement of the fire resistance properties goes against the mechanical and thermomechanical properties, currently there are no thermoplastic materials or compositions on the market that have the characteristics of high performances for all of these four properties combined.

PRIOR ART

Document EP 629678 is known, which describes thermoplastic alloys comprising mixtures of polyamide and of polypropylene, to which a zeolite (dehydrating agent) and ammonium polyphosphate are added in order to make them flame retardant. Document EP 704489 is also known, which describes compositions consisting of a polyamide matrix, dispersed in which are nodules of crosslinked polyolefin and flame retardants chosen from magnesium hydroxide, decabromodiphenyl ether, melamine cyanurate and pentaerythritol.

These two types of compositions certainly have a good fire resistance but these performances are obtained at the expense of the ductility of the materials (considerable loss of elongation at break, brittle nature on impact at ambient temperature). Furthermore, it is observed that the thermal stability of these materials was insufficient. The thermal stability is understood to mean the retention of the mechanical properties (and more particularly of the elongation at break) after various thermal aging operations (for example one week at 120° C.).

Document WO 07/141,449 in the name of the applicant is also known, which describes a thermoplastic composition predominantly comprising (by weight of the composition) a polyamide-block graft copolymer, ammonium polyphosphate and also a small amount of zeolite. Although they have high levels of flame retardancy (UL94-V0 classification), these materials suffer, on the one hand, from losses of the initial mechanical properties with respect to matrices that are not flame-retarded formed by the same polyamide-block graft copolymer and also, on the other hand, from the loss of their mechanical properties during thermally oxidizing aging operations in a ventilated oven, for example one week at a temperature of 150° C.

It will be noted that the polyamide-block graft copolymer does not have any resistance to flame propagation (UL94-NC classification for APOLHYA®), as is observed in the tests regarding the composition entitled "DM13".

Poly(pentabromobenzyl acrylate) was mentioned for the first time in document U.S. Pat. No. 4,128,709, which describes the solution polymerization of the pentabromobenzyl acrylate monomer.

Documents U.S. Pat. No. 4,996,276 and U.S. Pat. No. 5,072,028 are also known, which describe preparations for obtaining poly(pentabromobenzyl acrylate), by bulk polymerization or by reacting an alkali metal salt of an unsaturated acid with a substituted polybromobenzyl halide in a solvent that is immiscible with water and with a phase transfer catalyst.

BRIEF DESCRIPTION OF THE INVENTION

The present invention intends to overcome the drawbacks of the materials from the prior art by providing a thermoplastic composition that meets all of the requirements specific to electric cables, optical fibers and more generally insulating parts in the electrical and electrical engineering fields.

The applicant has now found a novel flame-retardant thermoplastic composition comprising a polyamide-block graft copolymer consisting of a polyolefin backbone and, on average, at least one polyamide graft wherein the grafts are attached to the backbone by the residues of an unsaturated monomer (X) having a function capable of reacting with a polyamide, the residues of the unsaturated monomer (X) are attached to the backbone by grafting or copolymerization via its double bond, characterized in that the composition comprises:

between 60% and 70% by weight of the polyamide-block graft copolymer, between 22% and 28% by weight of poly(pentabromobenzyl acrylate), between 4% and 8% by weight of a synergistic flame retardant selected from antimony trioxide, derivatives of tin, molybdenum and/or bismuth and also boron and zinc oxides, calcium borates, calcium sulfate and/or zinc stannate, between 0.5% and 5% by weight of organophilic treated clay.

Advantageously, the polyolefin backbone containing (X) is selected from ethylene/maleic anhydride and ethylene/alkyl (meth)acrylate/maleic anhydride copolymers. According to one particularly advantageous aspect for the composition, the number of monomers (X) attached to the polyolefin backbone is greater than or equal to 1.3 and/or less than or equal to 10. Moreover, the polyamide graft has a molar mass between 1000 and 5000 g/mol and preferably between 2000 and 3000 g/mol.

Furthermore, it would not be outside of the scope of the present invention if all or part of the polyolefin backbone and/or of the polyamide grafts were replaced by their respective mixture with modified clays, said mixtures being known to a person skilled in the art under the term "nanocomposites".

According to one preferred embodiment, the treated clay is present in the composition at, by weight, between 1% and 4%, preferably between 2% and 3.5%.

According to one preferred embodiment, the poly-(pentabromobenzyl acrylate) is present in the composition at, by weight, between 23% and 27%, preferably between 24% and 26%.

According to one preferred embodiment, the synergistic flame retardant is present in the composition at, by weight, between 5% and 7%, preferably between 5.5% and 6.5%. Preferably, the synergistic flame retardant is antimony trioxide.

According to one possibility offered by the invention, the composition consists of a mixture of the polyamide-block graft copolymer, poly(pentabromobenzyl acrylate), antimony trioxide and organophilic treated clay.

According to one possibility offered by the invention, the composition also comprises antioxidants, UV stabilizers, mineral fillers, anti-drip agents and/or coloring pigments. It would not be outside of the scope of the present invention if zeolites were added to the claimed thermoplastic compositions.

According to one preferred embodiment variant, the unsaturated monomer (X) of the polyamide-block graft copolymer is maleic anhydride.

The invention also relates to the use of the composition described above as a coating layer for a cable and also for electrical parts such as electrical connectors or in electrical engineering for molding articles such as housings.

However, these compositions may also be used for producing coating layers or thermal protection sleeves for fluid transfer lines (or pipes) in the automotive industry, in particular fuel or coolant lines.

The present invention also relates to a cable or pipe having at least two layers, at least one layer of which is formed by the aforesaid thermoplastic composition as mentioned above.

DETAILED DESCRIPTION OF THE INVENTION

Regarding the polyamide-block graft copolymer, it may be obtained by reacting a polyamide with the residues of an unsaturated monomer X attached by grafting or copolymerization to a polyolefin backbone.

This monomer X may be, for example, an unsaturated epoxide or an unsaturated carboxylic acid anhydride. The unsaturated carboxylic acid anhydride may be chosen, for example, from maleic, itaconic, citraconic, allylsuccinic, cyclohex-4-ene-1,2-dicarboxylic, 4-methylenecyclohex-4-ene-1,2-dicarboxylic, bicyclo-[2.2.1]hept-5-ene-2,3-dicarboxylic and x-methylbicyclo-[2.2.1]hept-5-ene-2,2-dicarboxylic anhydrides. Maleic anhydride is advantageously used. Replacing all or part of the anhydride with an unsaturated carboxylic acid, such as for example (meth)acrylic acid, would not be outside the scope of the invention.

Regarding the polyolefin backbone, a polyolefin is defined as a homopolymer or copolymer of $\alpha$-olefins or of diolefins, such as for example ethylene, propylene, but-1-ene, oct-1-ene or butadiene. By way of example, mention may be made of:

homopolymers and copolymers of polyethylene, in particular LDPE, HDPE, LLDPE (linear low density polyethylene), VLDPE (very low density polyethylene) and metallocene polyethylene;

homopolymers or copolymers of propylene;

ethylene/$\alpha$-olefin copolymers such as ethylene/propylene, EPR (ethylene-propylene rubber) and ethylene/propylene/diene (EPDM) copolymers;

styrene/ethylene-butylene/styrene (SEBS), styrene/-butadiene/styrene (SBS), styrene/isoprene/styrene (SIS), and styrene/ethylene-propylene/styrene (SEPS) block copolymers;

copolymers of ethylene with at least one product chosen from the salts or esters of unsaturated carboxylic acids such as alkyl (meth)acrylate (for example methyl acrylate), or the vinyl esters of saturated carboxylic acids such as vinyl acetate, it being possible for the proportion of comonomer to reach 40% by weight.

Advantageously, the polyolefin backbones to which the residues of X are attached are polyethylenes grafted with X or copolymers of ethylene and of X which are obtained, for example, by high-pressure radical polymerization.

Regarding the polyethylenes to which X is grafted, polyethylene is understood to mean homopolymers or copolymers.

As comonomers, mention may be made of:

$\alpha$-olefins, advantageously those having from 3 to 30 carbon atoms. Examples have been mentioned above. These $\alpha$-olefins may be used alone or as a mixture of two or more than two;

esters of unsaturated carboxylic acids, such as for example alkyl (meth)acrylates, it being possible for the alkyls to have up to 24 carbon atoms, examples of alkyl acrylate or methacrylate are in particular methyl methacrylate, ethyl acrylate, n-butyl acrylate, isobutyl acrylate and 2-ethylhexyl acrylate;

vinyl esters of saturated carboxylic acids, such as for example vinyl acetate or propionate;

dienes, such as for example 1,4-hexadiene.

The polyethylene may comprise several of the above comonomers.

Advantageously, the polyethylene, which may be a mixture of several polymers, comprises at least 50% and preferably 75% (in mols) of ethylene, its density may be between 0.86 and 0.98 g/cm$^3$. The MFI (melt flow index, measured at 190° C. under a load of 2.16 kg) is advantageously between 20 and 1000 g/10 min.

As examples of polyethylenes, mention may be made of:
low density polyethylene (LDPE);
high density polyethylene (HDPE);
linear low density polyethylene (LLDPE);
very low density polyethylene (VLDPE);

polyethylene obtained by metallocene catalysis;
EPR (ethylene-propylene rubber) elastomers;
EPDM (ethylene-propylene-diene) elastomers;
mixtures of polyethylene with an EPR or an EPDM;
ethylene/alkyl (meth)acrylate copolymers that may contain up to 60% by weight of (meth)acrylate and preferably 2% to 40%.

Grafting is an operation which is known per se.

Regarding the copolymers of ethylene and X, that is to say those in which X is not grafted, they are copolymers of ethylene, of X and optionally of another monomer that may be chosen from the comonomers that were mentioned above for the copolymers of ethylene that are intended to be grafted.

Use is advantageously made of ethylene/maleic anhydride and ethylene/alkyl (meth)acrylate/maleic anhydride copolymers. These copolymers comprise from 0.2% to 10% by weight of maleic anhydride, from 0 to 40%, and preferably from 5% to 40% by weight of alkyl (meth)-acrylate. Their MFI is between 5 and 100 (190° C.-2.16 kg). Their melting temperature is between 80° C. and 120° C. The alkyl (meth) acrylates have already been described above.

Advantageously, there are on average at least 2 mols of X per chain attached to the polyolefin backbone and preferably from 2 to 5 mol. A person skilled in the art may easily determine, by FTIR analysis (Fourrier Transform Infrared Analysis), the number of these moles of X. For example, if X is maleic anhydride and the weight-average molar mass of the polyolefin is 95 000 g/mol, it has been found that this corresponds to a proportion of anhydride of at least 1.5% by weight of the whole of the polyolefin backbone containing X, and preferably from 2.5% to 4% by weight. These values, combined with the mass of the polyamides, determine the proportion of polyamides and of backbone in the polyamide-block graft copolymer.

Regarding the polyamide, the term polyamide is understood to mean the condensation products:
- of one or more amino acids, such as aminocaproic, 7-aminoheptanoic, 11-aminoundecanoic and 12-aminododecanoic acids, and of one or more lactams such as caprolactam, oenantholactam and lauryllactam;
- of one or more salts or mixtures of diamines such as hexamethylenediamine, dodecamethylenediamine, meta-xylylenediamine, bis(p-aminocyclohexyl)methane and trimethylhexamethylenediamine with diacids such as isophthalic, terephthalic, adipic, azeleic, suberic, sebacic and dodecanedicarboxylic acids;
- or of mixtures of several monomers, which results in copolyamides.

It is possible to use mixtures of polyamides. Use is advantageously made of PA-6, PA-11, PA-12, the copolyamide containing 6 units and 11 units (PA-6/11), the copolyamide containing 6 units and 12 units (PA-6/12), and the copolyamide based on caprolactam, hexamethylenediamine and adipic acid (PA-6/6,6).

The degree of polymerization may vary to a large extent, depending on its value the product is a polyamide or a polyamide oligomer. In the remainder of the text, the two expressions will be used without distinction for the grafts.

In order for the polyamide to have a monoamine end group, it is sufficient to use a chain stopper of formula:

in which:
$R_1$ is a hydrogen atom or a linear or branched alkyl group containing up to 20 carbon atoms,
$R_2$ is a linear or branched alkyl or alkenyl group having up to 20 carbon atoms, a saturated or unsaturated cycloaliphatic radical, an aromatic radical or a combination of these. The stopper may, for example, be laurylamine, oleylamine, butylamine or hexylamine and generally any monoamine of $R_2$—$NH_2$.

Advantageously, the amine-terminated polyamide has a molar mass between 1000 and 5000 g/mol and preferably between 2000 and 3000 g/mol.

The preferred amino acid or lactam monomers for the synthesis of the monoamine oligomer according to the invention are chosen from caprolactam, 11-aminoundecanoic acid and lauryllactam.

The polycondensation defined above is carried out according to the commonly known processes, for example at a temperature in general between 200° C. and 350° C., under vacuum or in an inert atmosphere, with stirring of the reaction mixture. The average chain length of the oligomer is determined by the initial molar ratio between the polycondensable monomer or the lactam and the monofunctional polymerization stopper. For the calculation of their average chain length, one chain stopper molecule is usually counted per one oligomer chain.

The addition of the monoamine polyamide oligomer to the polyolefin backbone containing X is carried out by reacting an amine function of the oligomer with X. Advantageously, X bears an anhydride or acid function, thus creating amide or imide bonds.

In general, the addition of the amine-terminated oligomer to the polyolefin backbone containing X is preferably carried out in the melt state. It is thus possible, in a self-cleaning meshing co-rotating twin-screw extruder or in any other suitable equipment (internal mixer, Buss co-kneader, etc.) to melt blend the oligomer and the backbone at a temperature generally between 180° C. and 350° C. The average residence time of the molten material in the extruder may be between 5 seconds and 5 minutes, and preferably between 20 seconds and 1 minute. The efficiency of this addition is evaluated by selective extraction of the free polyamide oligomers, that is to say those which have not reacted to form the final polyamide-block graft copolymer.

The preparation of such amine-terminated polyamides and also their addition to a polyolefin backbone containing X is described in U.S. Pat. Nos. 3,976,720, 3,963,799, 5,342,886 and FR 2291225.

The polyamide-block graft copolymers of the present invention are characterized by a nanostructured arrangement with polyamide lamellae having a thickness of between 10 and 50 nanometers.

Advantageously, the proportion of polyolefin backbone is from 50% to 90% and that of the amine-terminated polyamide is from 10% to 50%.

The polyamide-block graft copolymer of the invention has a very good flow resistance at temperatures at least equal to 80° C. and that may range up to 200° C., that is to say they do not rupture under a load of 2 MPa.

The polyamide-block graft copolymers of the invention may be prepared by melt blending in extruders (single-screw but preferably twin-screw extruders), Buss co-kneaders, internal mixers and in general the conventional devices for blending thermoplastic polymers and preferably self-cleaning meshing co-rotating twin-screw extruders. The blends of the invention may also comprise fluidizing agents such as silica, ethylenebisamide, calcium stearate or magnesium stearate. They may also comprise antioxidants, UV stabilizers, mineral fillers and coloring pigments.

The compositions according to the invention may be prepared according to two different processes.

It is possible to prepare them according to a two-step process: in a first step, the polyamide-block graft copolymer is firstly prepared by reacting the polyolefin backbone bearing the X residue with the polyamide. Then, in a second step, the polyamide-block graft copolymer previously prepared is melt-blended with the flame-retardant additives: poly(pentabromobenzyl acrylate), antimony trioxide and organophilic treated clay.

It is also possible to prepare the compositions according to the invention according to a one-step process, during which the polyolefin backbone bearing the X residue, the polyamide and the flame-retardant additives, namely the poly(pentabromobenzyl acrylate), antimony trioxide and organophilic treated clay, are all mixed together.

Regarding the poly(pentabromobenzyl (meth)acrylate), it is a compound belonging to the family of polyhalogenated aromatic polymers. More particularly, the "poly(pentabromobenzyl (meth)acrylate)" polymer results from the polymerization of polybromosubstituted aromatic esters of α,β-unsaturated acids of the following formula:

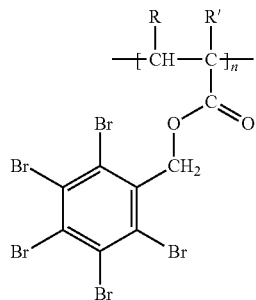

where R and R' are hydrogen atoms or alkyl groups.

Regarding the synergistic flame retardant, it is understood as having a synergistic function with the poly(pentabromobenzyl (meth)acrylate), so as to exponentially (and not obviously before tests were carried out on the compositions according to the invention) increase the flame-retardant properties otherwise conferred by the latter.

Preferably, this synergistic flame retardant is antimony trioxide but it would not be outside of the scope of the invention if the antimony trioxide was substituted by derivatives of tin, molybdenum or bismuth known to a person skilled in the art for also functioning synergistically with brominated flame retardants. Replacing the antimony trioxide with another antimony oxide ($Sb_2O_5$) or an antimony sulfide ($SbS_3$) could also be envisaged. Similarly, boron and zinc oxides, calcium borates, calcium sulfate or zinc stannate could also be envisaged.

Subsequently, tests on the compositions according to the invention were carried out on the basis of antimony trioxide which exhibits the most satisfactory results, nevertheless, the other compounds that act as a synergistic agent with poly (pentabromobenzyl acrylate) also show satisfactory results in the context of a composition according to the invention.

Regarding antimony trioxide more specifically, this product is conventionally in the form of a fine white powder that is insoluble in organic solvents, this is why this compound is here present in the form of masterbatches in a polyethylene matrix which acts as a support for it. Of course, provision could be made to add the antimony trioxide to the thermoplastic composition by other means, or even by incorporating pure or virtually pure antimony trioxide.

It would also not be outside the scope of the invention if "anti-drip" agents, such as products based on silicone (PDMS) or fluorinated products such as PTFE, were added to the compositions.

Regarding the organophilic treated clay, these are clays which are in the form of platelets. These clays are rendered organophilic by intercalation between the latter of swelling agents, which are organic molecules or polymers, and are obtained in particular according to a process as described in document U.S. Pat. No. 5,578,672.

Preferably, the clays used are of smectic type, or of natural origin such as, in particular, montmorillonites, bentonites, saponites, hectorites, fluorohectorites, beidellites, stibensites, nontronites, stipulgites, attapulgites, illites, vermiculites, halloysites, stevensites, zeolites, Fuller's earth and mica, or of synthetic origin, such as permutites.

By way of example, mention may be made of the organophilic clays described in U.S. Pat. No. 6,117,932. Preferably, the clay is modified with an organic substance via an ionic bond with an onium ion having 6 carbon atoms or more. If the number of carbon atoms is less than 6, the organic onium ion is too hydrophilic and therefore the compatibility with the olefinic copolymer may decrease. By way of example of an organic onium ion, mention may be made of hexylammonium ions, octylammonium ions, 2-ethylhexylammonium ions, dodecyl-ammonium ions, laurylammonium ions, octadecylammonium (stearylammonium) ions, dioctyldimethylammonium ions, trioctylammonium ions, distearyldimethylammonium ions, stearyltrimethylammonium ions and ammonium laurate ions. Other ions may be used, such as phosphonium and sulfonium ions. Use may also be made of amphoteric surfactants, derivatives of aliphatic, aromatic or arylaliphatic amines, phosphines and sulfides.

It is recommended to use a clay having the largest possible contact area with the polymer. The greater the contact area, the greater the separation of the clay lamellae. The cation-exchange capacity of clay is preferably between fifty and two hundred milliequivalents per 100 grams (g). If the capacity is less than fifty, the exchange of the onium ions is insufficient and the separation of the clay lamellae may be difficult. On the other hand, if the capacity is greater than two hundred, the bonding force between the clay lamellae is so strong that the separation of the lamellae may be difficult. By way of example of clay, mention may be made of smectite, montmorillonite, saponite, hectorite, beidellite, stibensite, nontronite, vermiculite, halloysite and mica. These clays may be of natural or synthetic origin. The proportion of organic onium ion is advantageously between 0.3 and 3 equivalents of the ion-exchange capacity of the clay. If the proportion is less than 0.3, the separation of the clay lamellae may be difficult. If the proportion is greater than 3, there may be degradation of the polymer. The proportion of the organic onium ion is preferably between 0.5 and 2 equivalents of the ion-exchange capacity of the clay. These organophilic clays have a high dispersibility in polymeric media under a low shear rate and modify the rheological behavior of these media. However, other types of lamellae fillers, such as zirconium or titanium phosphates, may be used according to the invention.

Obtaining the Formulations Tested:

The formulations described below are prepared by compounding using a COPERION ZSK40 self-cleaning meshing co-rotating twin-screw extruder having a diameter of 40 millimeters (mm), a length 40 times its diameter (i.e. 160 centimeters), heated with a flat profile at 250° C. with a throughput of 70 kg/h (kilograms per hour) and a rotational speed of 300 rpm (revolutions per minute), the polymers being introduced as main feed and the additives in powder form by side feeding into the molten polymer.

Generally, the term "compounding" is understood to mean a technique for obtaining polymers or blends of polymers that is well known to a person skilled in the art and which consists of shaping the formulate (that is present, for example, in the form of rods on leaving the kneader) by extrusion with a die having circular holes, then cutting the cooled rods and drying in order to manufacture granules having a diameter of a few millimeters.

Materials Used to Form the Formulations Tested:

Apolhya®: Sold by the applicant, is a product of the reaction of a mixture of monoamine-terminated PA-6 oligomer with Mn=2500 g/mol (30% by weight) and of Domamid 24 (20%) with 50% of an ethylene/ethyl acrylate (EA)/maleic anhydride (MAh) terpolymer having 17% EA and 3% MAh and an MFI (190° C., 2.16 kg) of 70 g/10 min.

Lotader®: Ethylene/ethyl acrylate (EA)/maleic anhydride (MAh) terpolymer, sold by the applicant and having 17% EA, 3% MAh and an MFI (2.16 kg, 190° C.) of 70 g/10 min.

Domamid® 24: PA-6 sold by DOMO, having a relative viscosity of 2.4 measured at 1% in 96% sulfuric acid according to the standard ISO 307.

Domamid® 27: PA-6 sold by DOMO, having a relative viscosity of 2.7 measured at 1% in 96% sulfuric acid according to the standard ISO 307.

TC Orgalloy: Polypropylene grafted by PA grafts as according to patent EP 0342066.

STAMILAN® P: Polypropylene produced by Sabic.

FR 1025®: Poly(pentabromobenzyl acrylate), sold by ICL-IP.

Polytriox® AOPE 8020: Masterbatch containing 80% antimony trioxide in a polyethylene matrix sold by Produit Chimique de Lucette.

MM nanoclay: Masterbatch containing 60% of Nanofil SE3010 (produced by Süd Chemie) in Lotryl® 28MA07 which is an ethylene/methyl acrylate (MeA) copolymer comprising 28% by weight of MeA and having an MFI (at 190° C., 2.16 kg, measured according to the standard ISO 1133) of 7 g/10 min. This masterbatch is produced, for example, on a Buss PR46 co-kneader at a throughput of 13 kg/h, a rotational speed of the co-kneader of 280 rpm and a flat temperature profile of 230° C., the EMA copolymer and the filler being introduced into the first well.

Exolit® AP766: Product based on ammonium polyphosphate produced by CLARIANT having a phosphorus content of 24% and a nitrogen content of 15%.

Siliporite® NK10AP: Molecular sieve of 4A zeolite type produced by CECA.

Magnifin® H5: Magnesium dihydroxide sold by Albemarle.

The present invention is illustrated in greater detail by the following non-limiting examples.

Example 1

The composition entitled "DM1" is a formulation that falls within the context of the present invention. It comprises, as a weight percentage of the total composition, 61% of Apolhya®, 28.5% of FR1025 and 6% of Polytriox AOPE 8020 and 4.5% of organophilic treated clay.

Example 2

The composition entitled "DM2" is a formulation that falls within the context of the present invention. It comprises, as a weight percentage of the total composition, 69.5% of Apolhya®, 22.3% of FR1025 and 6% of Polytriox AOPE 8020 and 2.2% of organophilic treated clay.

Example 3

The composition entitled "DM4" is a formulation that falls within the context of the present invention. It comprises, as a weight percentage of the total composition, 63.7% of Apolhya®, 27% of FR1025, 7.9% of Polytriox AOPE 8020 and 1.4% of organophilic treated clay.

Example 4

The composition entitled "DM5" is a formulation that falls within the context of the present invention. It comprises, as a weight percentage of the total composition, 67.7% of Apolhya®, 24% of FR1025, 4.1% of Polytriox AOPE 8020 and 4.2% of organophilic treated clay.

Example 5

The composition entitled "DM6" is a formulation that falls within the context of the present invention. It comprises, as a weight percentage of the total composition, 68% of Apolhya®, 25.4% of FR1025, 6% of Polytriox AOPE 8020 and 0.6% of organophilic treated clay.

Example 6

The composition entitled "DM6" is a formulation that falls within the context of the present invention. It comprises, as a weight percentage of the total composition, 65.8% of Apolhya®, 24% of FR1025, 5.3% of Polytriox AOPE 8020 and 4.9% of organophilic treated clay.

Example 7

The composition entitled "DM7" is a formulation that falls within the context of the present invention. It comprises, as a weight percentage of the total composition, 63.70% of Apolhya®, 27% of FR1025, 6% of Polytriox AOPE 8020 and 3.30% of organophilic treated clay.

Example 8

The composition entitled "DM8" is a formulation that falls within the context of the present invention. It comprises, as a weight percentage of the total composition, 62.3% of Apolhya®, 25.9% of FR1025, 7.2% of Polytriox AOPE 8020 and 4.6% of organophilic treated clay.

Example 9

The composition entitled "DM9" is a formulation that falls within the context of the present invention. It comprises, as a weight percentage of the total composition, 67.7% of Apolhya®, 25.2% of FR1025, 4.8% of Polytriox AOPE 8020 and 2.3% of organophilic treated clay.

Example 10

The composition entitled "DM10" is a formulation that falls within the context of the present invention. It comprises, as a weight percentage of the total composition, 64.7% of Apolhya®, 27.1% of FR1025, 6% of Polytriox AOPE 8020 and 2.2% of organophilic treated clay.

Furthermore, in order to compare the examples of the invention with respect to other flame-retardant thermoplastic compositions, the following composition examples were provided for the tests.

Example 11

The composition entitled "DM11" is a formulation from the prior art comprising, as a weight percentage of the thermoplastic composition, 44.60% of Bondine® HX8290, 19.10% of Domamid® 24, 27% of FR1025®, 6% of Polytriox AOPE 8020® and 3.30% of organophilic treated clay.

Example 12

The composition entitled "DM12" is a formulation comprising, as a weight percentage of the thermoplastic composition, 78% of Apolhya®, 20% of Exolit® AP766 and 2% of Siliporite® NK10AP.

Example 13

The composition entitled "DM13" is a formulation comprising 100% of Apolhya®.

Example 14

The composition entitled "DM14" is a formulation from the prior art comprising 29% PA-6, 11% of polypropylene (STAMILAN® P), 5% of TC Orgalloy and 55% of Magnifin H5 flame retardant.

Example 15

The composition entitled "DM15" is a formulation comprising, as a weight percentage of the composition, 58.4% of Apolhya®, 26% of FR1025 and 6% of Polytriox AOPE 8020, and 9.6% of organophilic treated clay.

Example 16

The composition entitled "DM16" is a formulation comprising, as a weight percentage of the composition, 71% of Apolhya®, 21% of FR1025, 5% of Polytriox AOPE 8020, and 3% of organophilic treated clay.

Example 17

The composition entitled "DM17" is a formulation comprising, as a weight percentage of the composition, 74% of Apolhya®, 21% of FR1025 and 5% of Polytriox AOPE 8020.

Example 18

The composition entitled "DM18" is a formulation comprising, as a weight percentage of the composition, 53% of Apolhya®, 40% of FR1025 and 7% of Polytriox AOPE 8020.

Example 19

The composition entitled "DM19" is a formulation comprising, as a weight percentage of the composition, 66.8% of Apolhya®, 27% of FR1025, 2.9% of Polytriox AOPE 8020, and 3.3% of organophilic treated clay.

Example 20

The composition entitled "DM20" is a formulation comprising, as a weight percentage of the composition, 67% of Apolhya®, 23% of FR1025 and 10% of Polytriox AOPE 8020.

Characterization of the Materials:

The granules are shaped using a ThermoHaake Rheocord System 40 laboratory twin-screw extruder equipped with a sheet die; the extruder being heated at 210° C. in order to give strips from which the test specimens necessary in order to characterize the materials will be cut.

In accordance with the objectives of the invention, the thermoplastic composition, in order to be satisfactory, must have a UL94-V0 classification, for a test specimen of defined thickness (1.6 mm), i.e. the best flame retardancy classification. This measurement of the resistance to flame propagation is measured by the UL94 test in accordance with the standard ISO 1210 and is the subject, in the table below, of the first test carried out on a standard test specimen for each composition.

Next, the second line of characterizations consists in noting the generation or otherwise of flaming drips (FD) or of non-flaming drips (NFD) during the UL94 test. It will be noted that, in order to achieve the V0 classification according to the UL94 flame propagation tests, it is possible for non-flaming drips (NFD) to appear, but in no case for flaming drips (FD) to appear.

The flow test in the flame consists in assessing whether the test specimen, subjected to the flame, in the first or second application thereof, flows under its own weight or not.

Next is the flow test in an oven (at high temperature and under a pressure greater than atmospheric pressure) for a certain time, in this case this flow test of the IFC-type test specimens cut from the films is carried out at 200° C. under a load of 2 MPa for 15 minutes and consists in measuring the elongation undergone by the test specimens. If the test specimen gives way under the load, the time to arrive at this failure is noted. This test is known to a person skilled in the art under the name "hot set test".

The last characterizations from the table represent the ultimate mechanical properties of the materials, in terms of elongation at break and tensile strength, measured according to the standard ISO R527: 93-1BA.

A material is considered to have good mechanical properties, in particular in the particular applications of pipes, cables and other insulators of the electrical field which must be able to be bent and stretched freely without breaking, when this elongation at break value is greater than 100%.

The tensile strength test consists of a tensile test carried out on standard test specimens of composition in order to determine at what applied force the latter yield or break. It is considered that a standard test specimen of thermoplastic composition tested as satisfactory must as a minimum be able to withstand the application of a force of at least 7 MPa without breaking. This test makes it possible to demonstrate the solidity of the composition/material.

The elongation at break and tensile strength tests are measured according to the standard ISO 527: 93-1BA from test specimens cut from the strips of thermoplastic compositions presented above.

In order to characterize the resistance to thermooxidation, the elongation at break half-life time is determined, which corresponds to the aging time required, at a given temperature (150° C. and 175° C. in a ventilated oven thermally controlled to ±2° C.) for the material to lose half the initial value of its elongation at break. Furthermore, only one composition according to the invention was tested (DM7) and compared to two compositions according to the prior art (DM12 and DM13), it being understood that the best results obtained with the formulation according to the invention may be generalized to all of the compositions of the invention.

All these tests are carried out conventionally by taking standard test specimens of identical shape for each composition tested and by making them undergo each test on a test bench, according to the definitions (shape, dimensions, test speeds, calibration of the machine, accuracy of the apparatus, etc.) given by the international standards and that are well known to a person skilled in the art.

The composition must satisfy all of the aforementioned tests in an optimal manner in order to be considered to be satisfactory from the point of view of its mechanical properties, its thermomechanical properties or in other words preserving its high-temperature mechanical properties, and finally its flame-retardant properties. As can be observed, the applicant observed, after its experimentations, that, surprisingly, the composition according to the invention perfectly satisfied all of the tests demonstrating that its mechanical, thermomechanical and flame-retardant properties are excellent, or in other words of a very high level.

Results of the Tests Carried Out on the Test Specimens of Various Formulations:

| | DM1 | DM2 | DM3 | DM4 | DM5 | DM6 | DM7 | DM8 | DM9 | DM10 | DM11 |
|---|---|---|---|---|---|---|---|---|---|---|---|
| APOLHYA Domamid 24 Lotader P2 | 61 | 69.5 | 63.7 | 67.7 | 68 | 63.7 | 64 | 62.3 | 67.7 | 64.7 | |
| Domamid 27 | | | | | | | | | | | 19.1 |
| PP (Stamilian ®) | | | | | | | | | | | 44.6 |
| TC Orgalloy | | | | | | | | | | | |
| FR 1025 | 27.8 | 22.3 | 27 | 24 | 25.4 | 27 | 27 | 25.9 | 25.2 | 27.1 | 27 |
| Polytriox AOPE 8020 | 6 | 6 | 7.9 | 4.1 | 6 | 6 | 6 | 7.2 | 4.8 | 6 | 6 |
| MM Nano clay | 4.2 | 2.2 | 1.4 | 4.2 | 0.6 | 3.3 | 3 | 4.6 | 2.3 | 2.2 | 3 |
| Exolit AP766 | | | | | | | | | | | |
| Magnifin H5 | | | | | | | | | | | |
| Siliporite NK10AP | | | | | | | | | | | |
| TESTS | | | | | | | | | | | |
| UL94 classification | V0 | V0 | V0 | V0 | V0 | V0 | V0 | V0 | V0 | V0 | V0 |
| FD/NFD on 10 applications of flame | No | No | No | No | No | No | No | No | No | No | No but 10 NFD |
| Flow in the flame | No | No | No | No | No | No | No | No | No | No | Yes |
| Flow at 160° C. under 2 bar for 15 min (% or time) | 3% el.* | 5% el.* | 2% el.* | 3% el.* | 8% el.* | 2.6% el.* | 2.5% el.* | 6% el.* | 7% el.* | 7% el.* | flows in 25 seconds |
| Elongation at break (%) | 120 | 140 | 110 | 120 | 120 | 100 | 103 | 115 | 120 | 112 | 32 |
| Tensile strength (MPa) | 11 | 12 | 10 | 11 | 10 | 9.4 | 9.6 | 10 | 11 | 11 | 3.5 |
| Half-life time at 150° C. (h) | | | | | | | 1350 | | | | |
| Half-life time at 175° C. (h) | | | | | | | 150 | | | | |

| | DM12 | DM13 | DM14 | DM15 | DM16 | DM17 | DM18 | DM19 | DM20 |
|---|---|---|---|---|---|---|---|---|---|
| APOLHYA Domamid 24 Lotader P2 | 78 | 100 | | 58.4 | 71 | 74 | 53 | 66.8 | 67 |
| Domamid 27 | | | 29 | | | | | | |
| PP (Stamilian ®) | | | 11 | | | | | | |
| TC Orgalloy | | | 5 | | | | | | |
| FR 1025 | | | | 26 | 21 | 21 | 40 | 27 | 23 |
| Polytriox AOPE 8020 | | | | 6 | 5 | 5 | 7 | 2.9 | 10 |
| MM Nano clay | | | | 9.6 | 3 | | | 3.3 | |
| Exolit AP766 | 20 | | | | | | | | |
| Magnifin H5 | | | 55 | | | | | | |
| Siliporite NK10AP | 2 | | | | | | | | |
| TESTS | | | | | | | | | |
| UL94 classification | V1 | NC | V0 | V0 | V1 | V2 | V2 | V1 | V2 |
| FD/NFD on 10 applications of flame | No | Yes (FD) | No | No | No | Yes | Yes | No | Yes |
| Flow in the flame | No | No | No | No | No | No | No | No | No |

| | | | | | | | | | |
|---|---|---|---|---|---|---|---|---|---|
| Flow at 160° C. under 2 bar for 15 min (% or time) | 10% el.* | 5% el.* | No | 4% el.* | 6% el.* | 7% el.* | 7% el.* | 3% el.* | 10% el.* |
| Elongation at break (%) | 94 | 401 | 22 | 32 | 200 | 224 | 11 | 120 | 130 |
| Tensile strength (MPa) | 35 | 32.4 | 4 | 6 | 21 | 17 | 19 | 12 | 13 |
| Half-life time at 150° C. (h) | 50 | 1350 | | | | | | | |
| Half-life time at 175° C. (h) | <10 | 125 | | | | | | | |

*stands for "elongation"

The invention claimed is:

1. A flame-retardant thermoplastic composition comprising a polyamide-block graft copolymer consisting of a polyolefin backbone and, on average, at least one polyamide graft wherein the grafts are attached to the backbone by the residues of an unsaturated monomer (X) having a function capable of reacting with a polyamide, the residues of the unsaturated monomer (X) are attached to the backbone by grafting or copolymerization via its double bond, wherein the composition comprises:
   between 60% and 70% by weight of the polyamide-block graft copolymer,
   between 22% and 28% by weight of poly(pentabromobenzyl acrylate),
   between 4% and 8% by weight of a synergistic flame retardant selected from the group consisting of at least one of antimony trioxide, antimony oxide, antimony sulfide, derivatives of tin, derivatives of molybdenum, derivatives of bismuth, boron, zinc oxides, calcium borates, calcium sulfate and zinc stannate,
   between 0.5% and 5% by weight of a clay intercalated by a swelling agent.

2. The composition as claimed in claim 1, wherein the polyolefin backbone containing (X) is selected from ethylene/maleic anhydride and ethylene/alkyl (meth)acrylate/maleic anhydride copolymers.

3. The composition as claimed in claim 1, wherein there are at least 1.3 mol of (X) attached to the polyolefin backbone.

4. The composition as claimed in claim 1, wherein the polyamide graft has a molar mass between 1000 and 5000 g/mol.

5. The composition as claimed in claim 1, wherein the polyamide-block graft copolymer comprises from 10% to 50% by weight of polyamide grafts.

6. The composition as claimed in claim 1, wherein the number of monomers (X) attached to the polyolefin backbone is greater than or equal to 1.3 and/or less than or equal to 10.

7. The composition as claimed in claim 1, wherein the clay is present in the composition between 1% and 4% by weight.

8. The composition as claimed in claim 1, wherein the poly-(pentabromobenzyl acrylate) is present in the composition between 23% and 27% by weight.

9. The composition as claimed in claim 1, wherein the synergistic flame retardant is present in the composition between 5% and 7% by weight.

10. The composition as claimed in claim 1, wherein the composition consists of a mixture of the polyamide-block graft copolymer, the poly(pentabromobenzyl acrylate), the antimony trioxide and the clay.

11. The composition as claimed in claim 1, wherein the composition further comprises at least one component selected from the group consisting of antioxidants, UV stabilizers, mineral fillers, coloring pigments, anti-drip agents and/or zeolites.

12. The composition as claimed in claim 1, wherein the unsaturated monomer (X) is maleic anhydride.

13. The composition as claimed in claim 1, wherein the synergistic flame retardant is antimony trioxide.

14. A coating layer for cable and/or for electric parts comprising the composition as claimed in claim 1.

15. A cable or pipe having at least two layers, at least one layer of which is formed by the thermoplastic composition as claimed in claim 1.

16. A flame-retardant thermoplastic composition comprising a polyamide-block graft copolymer consisting of a polyolefin backbone and, on average, at least one polyamide graft wherein the grafts are attached to the backbone by the residues of an unsaturated monomer (X) having a function capable of reacting with a polyamide, the residues of the unsaturated monomer (X) are attached to the backbone by grafting or copolymerization via its double bond, wherein the composition comprises:
   between 60% and 70% by weight of the polyamide-block graft copolymer,
   between 22% and 28% by weight of poly(pentabromobenzyl acrylate),
   between 4% and 8% by weight of a synergistic flame retardant selected from the group consisting of at least one of antimony trioxide, antimony oxide, antimony sulfide, derivatives of tin, derivatives of molybdenum, derivatives of bismuth, boron, zinc oxides, calcium borates, calcium sulfate and zinc stannate,
   between 0.5% and 5% by weight of a clay modified with an onium ion.

17. A coating layer for cable and/or for electric parts comprising the composition as claimed in claim 16.

18. A cable or pipe having at least two layers, at least one layer of which is formed by the thermoplastic composition as claimed in claim 16.

19. The composition as claimed in claim 16, wherein the polyolefin backbone containing (X) is selected from ethylene/maleic anhydride and ethylene/alkyl (meth)acrylate/maleic anhydride copolymers.

20. The composition as claimed in claim 16, wherein the clay is present in the composition between 1% and 4% by weight.

21. The composition as claimed in claim 1, wherein the clay is in the form of platelets.

22. The composition as claimed in claim 16, wherein the unsaturated monomer (X) is maleic anhydride.

23. The composition as claimed in claim 16, wherein the synergistic flame retardant is antimony trioxide.

24. The composition as claimed in claim 16, wherein the poly-(pentabromobenzyl acrylate) is present in the composition between 23% and 27% by weight.

25. The composition as claimed in claim 16, wherein the synergistic flame retardant is present in the composition between 5% and 7% by weight.

26. The composition as claimed in claim 16, wherein the onium ion has six carbon atoms or more.

* * * * *